(12) United States Patent
Itsukaichi

(10) Patent No.: US 12,367,624 B2
(45) Date of Patent: Jul. 22, 2025

(54) APPARATUS FOR GENERATING A PSEUDO-REPRODUCING IMAGE, AND NON-TRANSITORY COMPUTER-READABLE MEDIUM

(71) Applicant: NEC Corporation, Tokyo (JP)

(72) Inventor: Hiroki Itsukaichi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/801,468

(22) PCT Filed: Jan. 7, 2021

(86) PCT No.: PCT/JP2021/000331
§ 371 (c)(1),
(2) Date: Aug. 22, 2022

(87) PCT Pub. No.: WO2021/186853
PCT Pub. Date: Sep. 23, 2021

(65) Prior Publication Data
US 2023/0104858 A1 Apr. 6, 2023

(30) Foreign Application Priority Data
Mar. 19, 2020 (JP) ................................. 2020-049868

(51) Int. Cl.
*G06T 11/60* (2006.01)
*G06T 7/70* (2017.01)
(Continued)

(52) U.S. Cl.
CPC ................ *G06T 11/60* (2013.01); *G06T 7/70* (2017.01); *G06V 20/58* (2022.01); *G08G 1/166* (2013.01); *G06T 2207/30252* (2013.01)

(58) Field of Classification Search
CPC . G06T 11/60; G06T 7/70; G06T 2207/30252; G06T 19/006; G06V 29/58; G08G 1/166; G08G 1/01
See application file for complete search history.

(56) References Cited

U.S. PATENT DOCUMENTS 10,924,679 B2 * 2/2021 Lee .................. G06V 20/56
2012/0257058 A1 * 10/2012 Kinoshita ............ G08G 1/165
348/148

(Continued)

FOREIGN PATENT DOCUMENTS

JP 2005-227947 A 8/2005
JP 2013-092992 A 5/2013
(Continued)

OTHER PUBLICATIONS

International Search Report for PCT Application No. PCT/JP2021/000331, mailed on Mar. 23, 2021.
(Continued)

*Primary Examiner* — Jin Cheng Wang
(74) *Attorney, Agent, or Firm* — Sughrue Mion, PLLC

(57) ABSTRACT

An image generation apparatus (20) includes an acquisition unit (210), a data processing unit (220), and a display (230). The acquisition unit (210) repeatedly acquires analysis data from at least one sending apparatus (10). The analysis data include at least type data and relative position data. The data processing unit (220) generates a reconfigured image by using the analysis data each time the data processing unit (220) acquires the analysis data, and displays the reconfigured image on the display (230). The reconfigured image includes an indication based on the type data in a position associated with the relative position data. The display may be a mark imitating an outer shape of a kind indicated by the type data, or may be an abstract mark.

20 Claims, 11 Drawing Sheets

(51) Int. Cl.
*G06V 20/58* (2022.01)
*G08G 1/16* (2006.01)

(56) References Cited

U.S. PATENT DOCUMENTS

| | | | | |
|---|---|---|---|---|
| 2014/0002660 | A1* | 1/2014 | Takahashi | G06V 20/56 |
| | | | | 348/148 |
| 2015/0077562 | A1* | 3/2015 | Heckel | G06T 19/006 |
| | | | | 348/148 |
| 2017/0158134 | A1* | 6/2017 | Shigemura | H04N 7/181 |
| 2017/0220877 | A1* | 8/2017 | Kakegawa | G08G 1/166 |
| 2017/0316575 | A1* | 11/2017 | Adachi | G06T 5/50 |
| 2018/0105040 | A1* | 4/2018 | Ryu | G08G 1/167 |
| 2018/0164114 | A1* | 6/2018 | Chiu | G01C 21/3697 |
| 2018/0208199 | A1 | 7/2018 | Fujita et al. | |
| 2018/0225963 | A1 | 8/2018 | Kobayashi et al. | |
| 2018/0257489 | A1* | 9/2018 | Watanabe | B60K 35/00 |
| 2019/0061742 | A1* | 2/2019 | Kubo | G06V 20/58 |
| 2019/0066382 | A1* | 2/2019 | Kubo | B60R 1/00 |
| 2019/0113926 | A1* | 4/2019 | Sim | G05D 1/0214 |
| 2019/0333380 | A1 | 10/2019 | Kobayashi et al. | |
| 2019/0382003 | A1 | 12/2019 | Jiang et al. | |
| 2020/0180502 | A1* | 6/2020 | Mitsuya | G08G 1/166 |
| 2020/0183157 | A1* | 6/2020 | Suzuki | G02B 27/01 |
| 2020/0184654 | A1* | 6/2020 | Kim | G06T 7/74 |
| 2020/0231210 | A1* | 7/2020 | Anderson | A01B 69/001 |
| 2020/0302657 | A1* | 9/2020 | Shimazu | H04N 7/18 |
| 2020/0327333 | A1* | 10/2020 | Kunitsu | G06F 3/011 |
| 2020/0391751 | A1* | 12/2020 | Fujiyoshi | G06T 7/136 |
| 2021/0081684 | A1* | 3/2021 | Yamamoto | B60R 1/28 |
| 2021/0158623 | A1* | 5/2021 | Suzuki | G06F 3/0484 |
| 2021/0174099 | A1* | 6/2021 | Okubi | G06V 20/64 |
| 2021/0224560 | A1* | 7/2021 | Kim | G08G 1/166 |
| 2022/0048502 | A1* | 2/2022 | Kim | B60W 30/0953 |
| 2022/0383645 | A1* | 12/2022 | Hayashi | G08G 1/166 |
| 2023/0031419 | A1* | 2/2023 | Shimizu | B60W 40/072 |
| 2023/0297103 | A1* | 9/2023 | Otaki | G06V 20/56 |
| | | | | 701/2 |

FOREIGN PATENT DOCUMENTS

| | | |
|---|---|---|
| JP | 2013-095375 A | 5/2013 |
| JP | 2017-151798 A | 8/2017 |
| JP | 2020-009428 A | 1/2020 |
| WO | 2013/042767 A1 | 3/2013 |
| WO | 2017/013750 A1 | 1/2017 |
| WO | 2017/047176 A1 | 3/2017 |

OTHER PUBLICATIONS

Japanese Office Action for JP Application No. 2022-508078 mailed on Jan. 23, 2024 with English Translation.

JP Office Communication for JP Application No. 2022-508078, mailed on Jun. 25, 2024 with English Translation.

* cited by examiner

APPARATUS FOR GENERATING A PSEUDO-REPRODUCING IMAGE, AND NON-TRANSITORY COMPUTER-READABLE MEDIUM

This application is a National Stage Entry of PCT/JP2021/000331 filed on Jan. 7, 2021, which claims priority from Japanese Patent Application 2020-049868 filed on Mar. 19, 2020, the contents of all of which are incorporated herein by reference, in their entirety.

TECHNICAL FIELD

The present invention relates to an image generation apparatus, an image generation method, and a program.

BACKGROUND ART

In recent years, a configuration has been increasing in which various sensors such as a camera are loaded in a vehicle such as an automobile. For example, Patent Document 1 describes that a server acquires, from a plurality of vehicles including an own vehicle, detection results of these sensors, the server predicts an action of the own vehicle and another vehicle, the server performs a risk analysis by using the prediction result, and the server visualizes a possibility of a collision by augmented reality.

RELATED DOCUMENT

Patent Document

[Patent Document 1] Japanese Patent Application Publication No. 2020-9428

DISCLOSURE OF THE INVENTION

Technical Problem

Since enabling an image generated by an image capturing unit loaded in a vehicle to be checked in a surveillance center allows a surveillance person to visually check a state of the vicinity of the vehicle, it is possible to reduce a risk of traffic accident. On the other hand, when sending an image as it is to the surveillance center increases an amount of communication.

One example of an object of the present invention is to allow, at a surveillance center, to visually check a state around a vehicle while suppressing a communication amount.

Solution to Problem

An image generation apparatus according to an example aspect of the present invention includes:
an acquisition unit that repeatedly acquires analysis data, the analysis data being a result of processing a captured image generated by an image capturing unit loaded in a vehicle, and the analysis data including type data and relative position data, the type data indicating a kind of an object located in a vicinity of the vehicle and the relative position data indicating a relative position of the object with respect to the vehicle; and
a data processing unit that generates a reconfigured image each time the acquisition unit acquires the analysis data, the reconfigured image including an indication based on the type data in a position associated with the relative position data, and displaying the generated reconfigured image on a display.

An image generation method according to an example aspect of the present invention includes:
by a computer,
acquisition processing of repeatedly acquiring analysis data, the analysis data being a result of processing a captured image generated by an image capturing unit loaded in a vehicle, and the analysis data including type data and relative position data, the type data indicating a kind of an object located in a vicinity of the vehicle and the relative position data indicating a relative position of the object with respect to the vehicle; and
data processing of generating a reconfigured image each time the analysis, data are acquired, the reconfigured image including an indication based on the type data in a position associated with the relative position data, and displaying the generated reconfigured image on a display.

A program according to an example aspect of the present invention causes a computer to include:
an acquisition function of repeatedly acquiring analysis data, the analysis data being a result of processing a captured image generated by an image capturing unit loaded in a vehicle, and the analysis data including type data and relative position data, the type data indicating a kind of an object located in a vicinity of the vehicle and the relative position data indicating a relative position of the object with respect to the vehicle; and
a data processing function of generating a reconfigured image each time the analysis, data are acquired, the reconfigured image including an indication based on the type data in a position associated with the relative position data, and displaying the generated reconfigured image on a display.

Advantageous Effects of Invention

The present invention allows, at a surveillance center, to visually check a state around a vehicle while suppressing a communication amount.

DESCRIPTION OF EMBODIMENTS

In the following, an example embodiment according to the present invention is described with reference to the drawings. Note that, in all drawings, a similar constituent element is indicated by a similar reference sign, and description thereof is not repeated as necessary.

Figure 1:
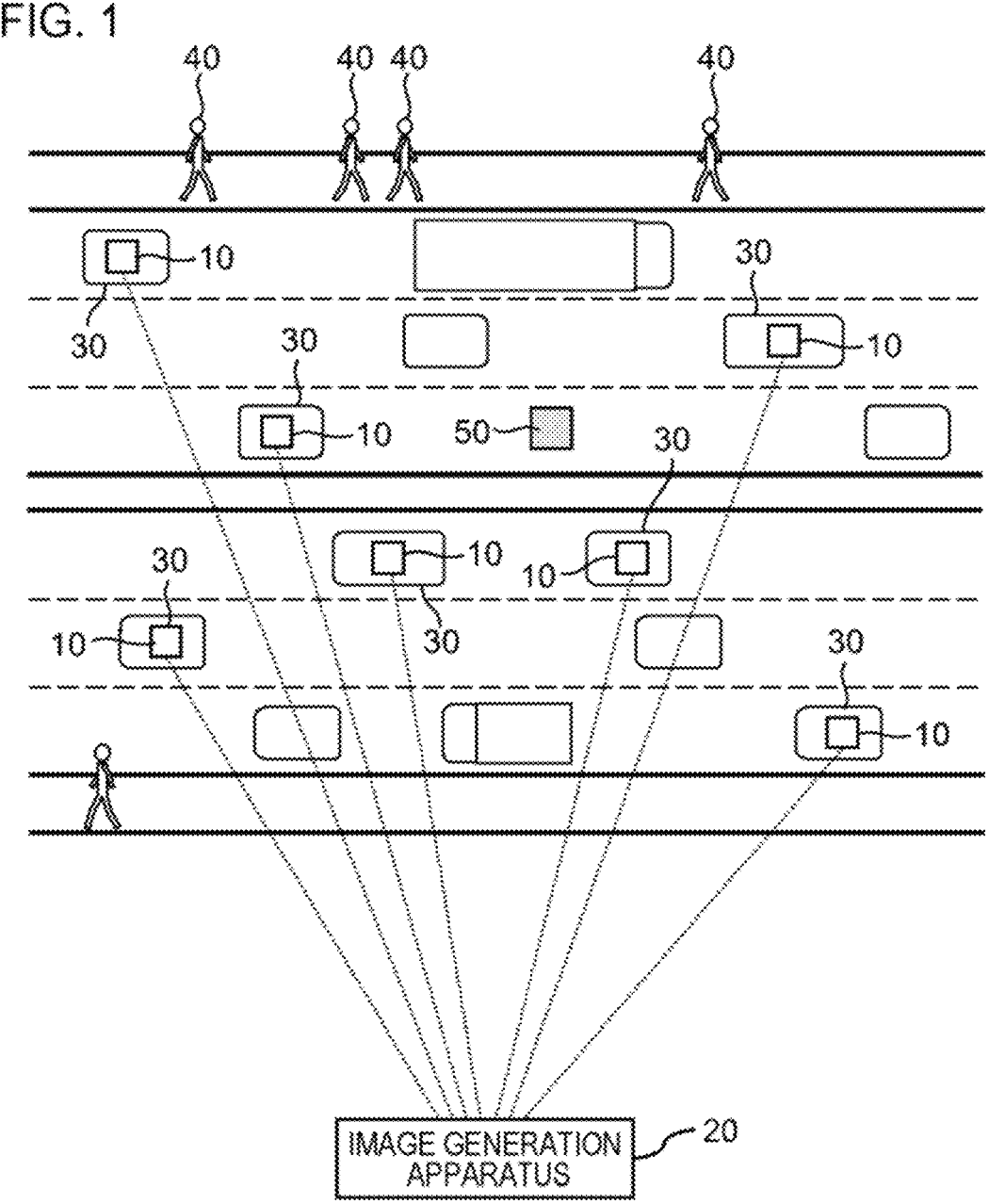
FIG. 1 is diagram illustrating a usage environment of an image generation apparatus according to an example embodiment.

FIG. 1 is a diagram illustrating a usage environment of an image generation apparatus 20 according to an example embodiment. The image generation apparatus 20 is one example of a data processing apparatus, and is used together with a plurality of sending apparatuses 10. The image generation apparatus 20 is installed in a surveillance center. In the surveillance center, a surveillance person is surveying, for example, a road and a vehicle 30. Herein, the vehicle 30 may also be an autonomously driven vehicle.

The sending apparatus 10 is loaded in the vehicle 30, generates an image (photographed image) acquired by photographing the vicinity of the vehicle 30, for example, in front of the vehicle 30, and also sends, to the image generation apparatus 20, a result (hereinafter, described as analysis data) of processing the image. The analysis data include at least type data indicating a kind of an object located in the vicinity of the vehicle 30 (hereinafter, described as a first vehicle 30) in which the sending apparatus 10 is loaded, and relative position data indicating a relative position of the object with respect to the first vehicle 30. Herein, the object may be another vehicle 30 (hereinafter, described as a second vehicle 30), may be a pedestrian 40, may be a fallen object 50 present on a road, or may be a traffic sign disposed in the vicinity of a road or a road sign drawn on a road. Further, the image generation apparatus 20 generates a reconfigured image by using the analysis data, and displays the reconfigured image on a display. A position of an object within the reconfigured image is associated with a position where the object is present in a real space. Therefore, a surveillance person can visually recognize an environment of the vicinity of the first vehicle 30 by watching the reconfigured image.

Further, the image generation apparatus 20 requests the sending apparatus 10 for an image itself according to needs. As one example, in a case where a predetermined input from a user (e.g., a surveillance person) of the image generation apparatus 20 is present, the image generation apparatus 20 requests the sending apparatus 10 for an image. Then, the sending apparatus 10 sends the image to the image generation apparatus 20. In this case, the image generation apparatus 20 displays, on a display, the image generated by the sending apparatus 10. Thus, a user of the image generation apparatus 20 can directly check the image generated by the sending apparatus 10.

Figure 2:
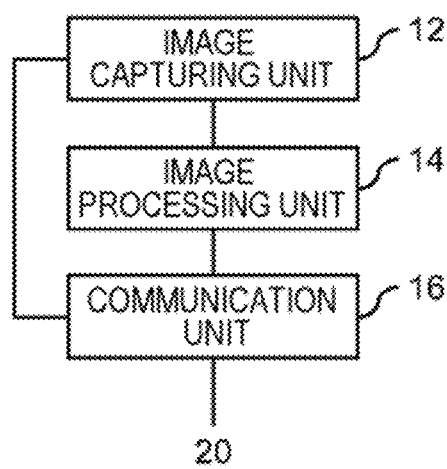
FIG. 2 is a diagram illustrating one example of a functional configuration of a sending apparatus.

FIG. 2 is a diagram illustrating one example of a functional configuration of the sending apparatus 10. As described above, the sending apparatus 10 is loaded in a vehicle. In the example illustrated in FIG. 2, the sending apparatus 10 includes an image capturing unit 12, an image processing unit 14, and a communication unit 16. The image capturing unit 12 is, for example, an in-vehicle camera, and repeatedly photographs the vicinity of the first vehicle 30, for example, the vicinity (e.g., at least one of in front, by the side, and in back) of the first vehicle 30. The image capturing unit 12 may be a monocular camera, or may be a stereo camera. A framerate at this occasion is, for example, 10 frames per second or more, but is not limited thereto. Each time the image capturing unit 12 generates an image, the image processing unit 14 generates the above-described analysis data by processing the image. Each time the image processing unit 14 generates analysis data, the communication unit 16 sends the analysis data to the image generation apparatus 20. Further, when an image is requested from the image generation apparatus 20, the communication unit 16 sends, to the image generation apparatus 20, an image generated by the image capturing unit 12.

As described above, analysis data to be generated by the image processing unit 14 include type data indicating a kind of an object located in the vicinity of the first vehicle 30, and relative position data indicating a relative position of the object with respect to the first vehicle 30. The analysis data may include other pieces of data according to needs.

For example, analysis data may include data (hereinafter, described as road data) indicating a state of a road located in the vicinity (e.g., at least one of in front, by the side, and in back) of the first vehicle 30. Examples of a state of a road include, for example, a width, a state of extension, and a sign drawn on a road, but a state of a road is not limited thereto.

Further, in a case where an object is the second vehicle 30, analysis data may include relative velocity data. The relative velocity data indicate a relative velocity between the first vehicle 30 and the second vehicle 30. The relative velocity data are computed, for example, by using a change in a position of the second vehicle 30 between images, but may be generated by using an unillustrated sensor.

Note that, analysis data may indicate data indicating a difference with respect to analysis data sent in the past, for example, a difference with respect to type data and relative position data being indicated by analysis data sent in the past. Herein, a piece of "analysis data sent in the past" may be a piece of analysis data sent immediately before, or may be a piece of analysis data sent at a predetermined timing.

Further, the communication unit 16 may send, together with analysis data, information that discriminates the first vehicle 30 from another vehicle 30. Furthermore, the communication unit 16 may send, together with analysis data, other pieces of data related to the first vehicle 30. The other pieces of data include, for example, at least either one of data (hereinafter, described as vehicle position data) indicating a position of the first vehicle 30, and data (hereinafter, described as vehicle velocity data) indicating velocity of the first vehicle 30. Herein, vehicle position data are generated, for example, by using a GPS, and vehicle velocity data are generated by using a velocimeter loaded in the first vehicle 30.

Figure 3:
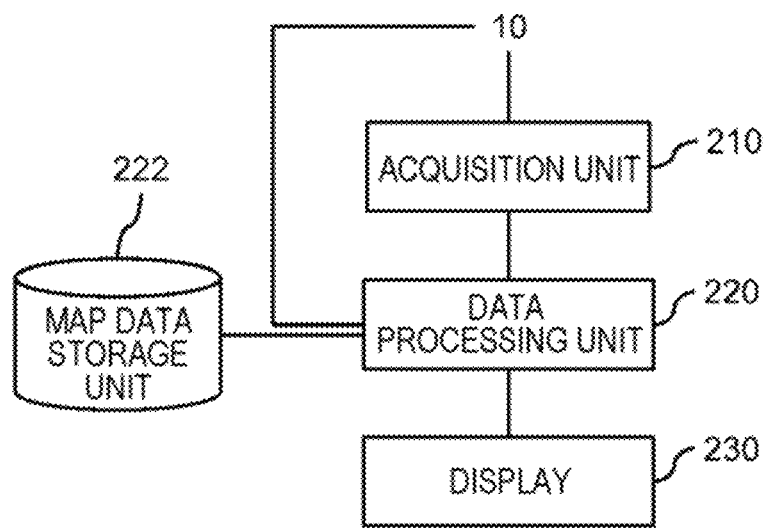
FIG. 3 is a diagram illustrating one example of a functional configuration of the image generation apparatus.

FIG. 3 is a diagram illustrating one example of a functional configuration of the image generation apparatus 20. In the example illustrated in FIG. 3, the image generation apparatus 20 includes an acquisition unit 210, a data processing unit 220, and a display 230. The acquisition unit 210 repeatedly acquires analysis data from at least one of the sending apparatuses 10. As described above, the analysis data include at least type data and relative position data. Each time the data processing unit 220 acquires analysis data, the data processing unit 220 generates a reconfigured image by using the analysis data, and causes the display 230 to display the reconfigured image. Herein, the display 230 may be located on the outside of the image generation apparatus 20. In this case, the image generation apparatus 20 is achieved by a cloud server, and the display 230 may be disposed in a surveillance center. A reconfigured image includes an indication based on type data at a position associated with relative position data. The indication may be a mark imitating an outer shape of a kind indicated by the type data, or may be a symbolized mark.

Further, in a case where analysis data include the above-described road data, the data processing unit 220 may include, in a reconfigured image, an indication of a road according to the road data. In this case, the data processing unit 220 reproduces a road on which the first vehicle 30 is traveling in a reconfigured image, and also reproduces an object located in the vicinity of the first vehicle 30 in the reconfigured image. Specifically, a reconfigured image becomes an image that reproduces the vicinity of the first vehicle 30.

Further, in a case where analysis data include the above-described relative velocity data, and the acquisition unit 210 acquires vehicle velocity data together with the analysis data, the data processing unit 220 may estimate velocity of the second vehicle 30 by using the vehicle velocity data and the relative velocity data, and may include, in a reconfigured image, an indication indicating the estimation result, or may display the indication together with the reconfigured image. The estimation result may be displayed, for example, near the second vehicle 30 for which the estimation is performed, or may be displayed in a form of a list.

Note that, the data processing unit 220 may use information stored in a map data storage unit 222 at a time of generating a reconfigured image. The map data storage unit 222 stores map data in association with position information. Further, the acquisition unit 210 acquires, together with analysis data, the above-described vehicle position data. Further, the data processing unit 220 acquires, from the map data storage unit 222, map data including a location associated with vehicle position data. The map data include at least a width and a shape of a road. Further, the data processing unit 220 includes, in a reconfigured image, a road based on the map data. The road is at least the one acquired by reproducing a road on which the vehicle 30 is traveling.

Note that, the map data storage unit 222 may be a part of the image generation apparatus 20, or may be located on the outside of the image generation apparatus 20.

Further, the data processing unit 220 may request the sending apparatus 10 for an image generated by the image capturing unit 12, when a criterion is satisfied. In this case, the data processing unit 220 causes the display 230 to display an image acquired from the sending apparatus 10. Note that, the criterion may be defined, for example, regarding analysis data, or may be defined regarding an input to the image generation apparatus 20 by a user (surveillance person). A specific example of the criterion will be described later by using another diagram.

Figure 4:
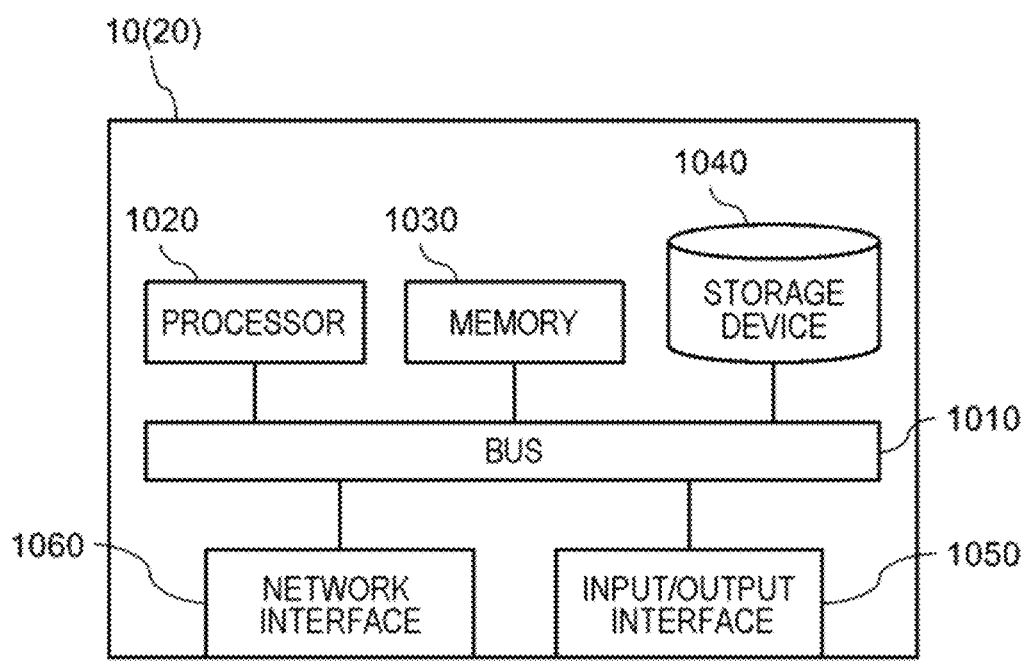
FIG. 4 is a diagram illustrating a hardware configuration example of a main part of the sending apparatus.

FIG. 4 is a diagram illustrating a hardware configuration example of a main part of the sending apparatus 10. The sending apparatus 10 includes a bus 1010, a processor 1020, a memory 1030, a storage device 1040, an input/output interface 1050, and a network interface 1060.

The bus 1010 is a data transmission path along which the processor 1020, the memory 1030, the storage device 1040, the input/output interface 1050, and the network interface 1060 mutually send and receive data. However, a method of mutually connecting the processor 1020 and the like is not limited to bus connection.

The processor 1020 is a processor to be achieved by a central processing unit (CPU), a graphics processing unit (GPU), or the like.

The memory 1030 is a main storage apparatus to be achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (e.g., the image processing unit 14 and the communication unit 16) of the sending apparatus 10. The processor 1020 achieves each function associated with each program module by reading each of these program modules in the memory 1030 and executing each of these program modules.

The input/output interface 1050 is an interface for connecting the main part of the sending apparatus 10 and various types of input/output equipment each other. For example, the main part of the sending apparatus 10 communicates with the image capturing unit 12 via the input/output interface 1050.

The network interface 1060 is an interface for connecting the sending apparatus 10 to a network. The network is, for example, a local area network (LAN) or a wide area network (WAN). A method of connecting the network interface 1060 to a network may be wireless connection or may be wired connection. The sending apparatus 10 communicates with the image generation apparatus 20 via the network interface 1060.

Note that, a hardware configuration example of the image generation apparatus 20 is also as illustrated in FIG. 4. In this case, the storage device 1040 stores a program module that achieves a function (e.g., the acquisition unit 210 and the data processing unit 220) of the image generation apparatus 20. Further, the storage device 1040 also functions as the map data storage unit 222.

Figure 5:
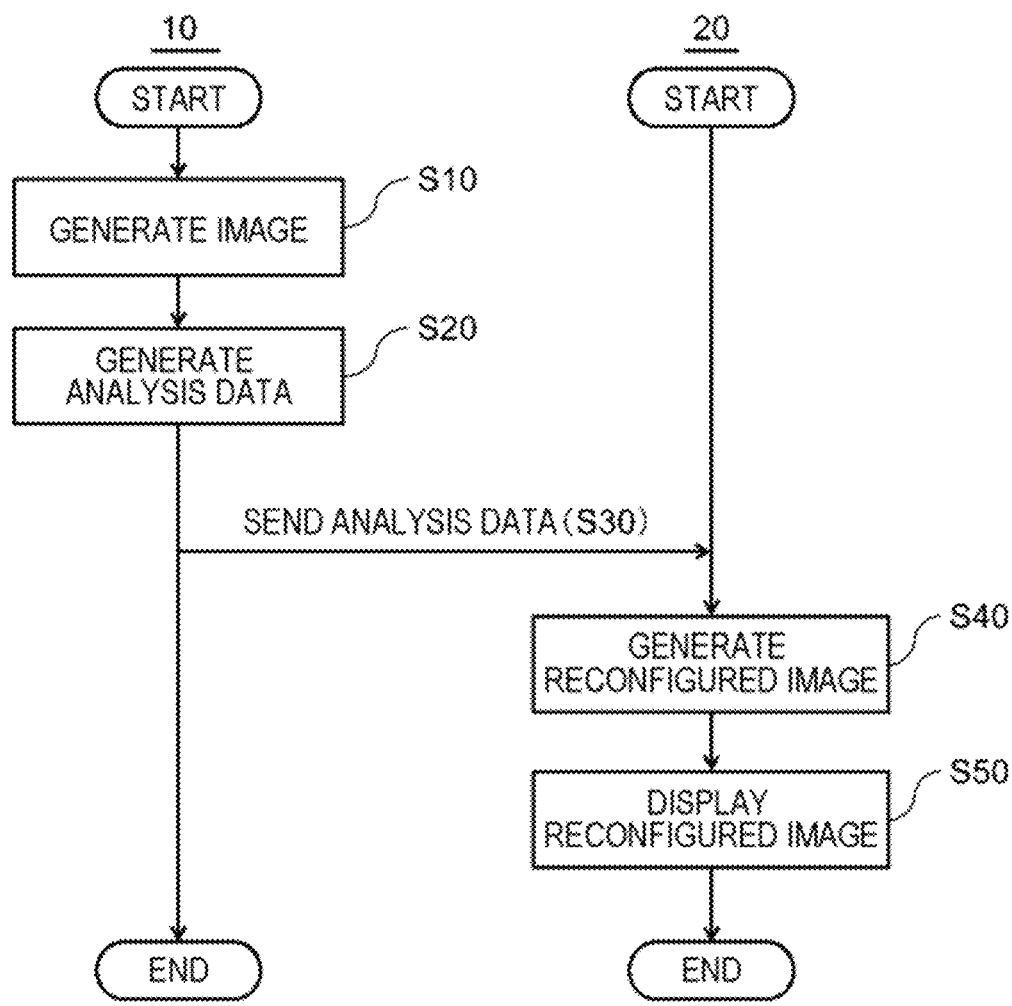
FIG. 5 is a flowchart illustrating a first example of processing to be performed by the image generation apparatus.

FIG. 5 is a flowchart illustrating a first example of processing to be performed by the image generation apparatus 20 together with processing to be performed by the sending apparatus 10. The sending apparatus 10 and the image generation apparatus 20 perform processing illustrated in FIG. 5, each time the image capturing unit 12 of the sending apparatus 10 generates an image.

When the image capturing unit 12 generates an image (step S10), the image processing unit 14 of the sending apparatus 10 generates analysis data by processing the image (step S20). Subsequently, the communication unit 16 of the sending apparatus 10 sends, to the image generation apparatus 20, the analysis data generated in the step S20. At this occasion, the communication unit 16 sends, together with the analysis data, relative velocity data and vehicle velocity data of the first vehicle 30 (step S30).

The acquisition unit 210 of the image generation apparatus 20 acquires data sent from the sending apparatus 10. Then, the data processing unit 220 of the image generation apparatus 20 generates a reconfigured image by using the data acquired by the acquisition unit 210 (step S40), and causes the display 230 to display the reconfigured image (step S50).

Note that, processing described in the step S20 and thereafter may be performed only for a part of an image generated by the image capturing unit 12. For example, in the step S10, the image capturing unit 12 may perform photographing at a framerate (e.g., 24 frames per second or more) of an ordinary moving image, and processing in the step S20 and thereafter may be performed at a framerate (e.g., 12 frames per second), which is lower than that of the image capturing unit 12.

Further, a frequency with which processing indicated in the step S20 and thereafter is performed may be changed according to velocity of the first vehicle 30. As one example, as velocity of the first vehicle 30 increases, the frequency increases. By doing so, load on the sending apparatus 10 and the image generation apparatus 20 decreases, when velocity of the first vehicle 30 is low.

Note that, in the step S30, the communication unit 16 may send, to the image generation apparatus 20, only a part of pieces of analysis data generated in the step S20. For example, the communication unit 16 may send, to the image generation apparatus 20, only pieces of data related to the second vehicle 30 and a traffic sign. In this case, the data processing unit 220 of the image generation apparatus 20 requests the sending apparatus 10 for all pieces of analysis data according to needs. One example is a case that a predetermined input from a surveillance person is present. Then, thereafter, the communication unit 16 of the sending apparatus 10 sends, to the image generation apparatus 20, all pieces of analysis data (e.g., a piece of data related to the fallen object 50 on a road). By doing so, an amount of communication between the sending apparatus 10 and the image generation apparatus 20 decreases.

Figure 6:
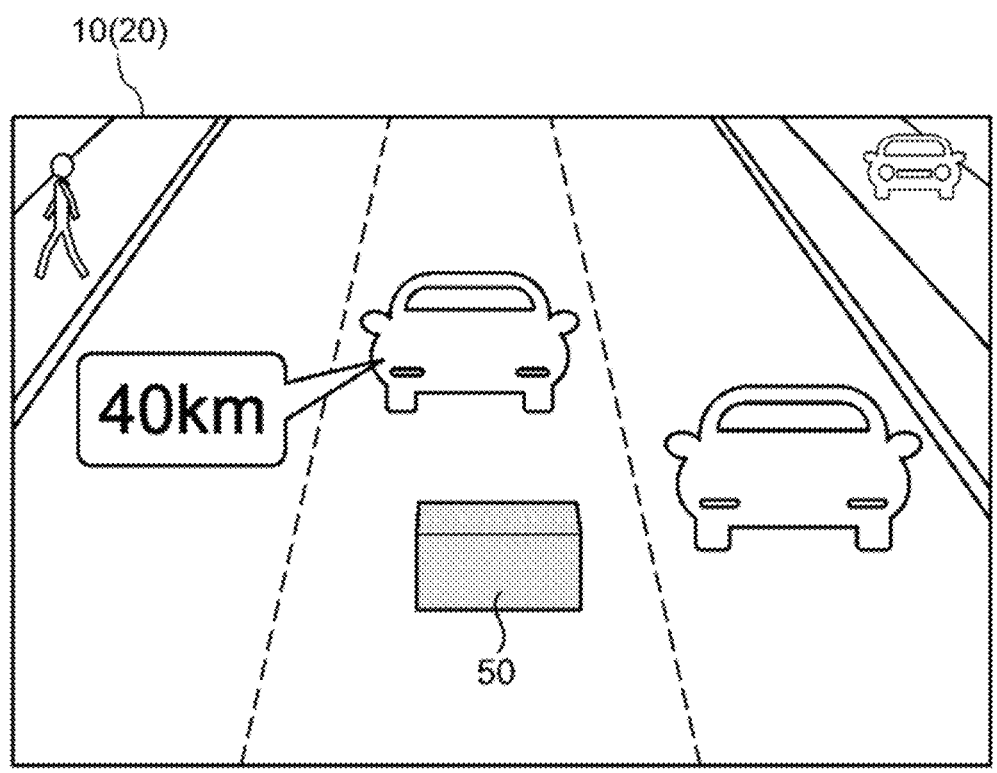
FIG. 6 is a diagram illustrating a first example of a reconfigured image to be displayed on a display in step S50.

FIG. 6 illustrates a first example of a reconfigured image to be displayed on the display 230 in the step S50. In the example illustrated in FIG. 6, the data processing unit 220 generates, as a reconfigured image, an image in which an outside of the first vehicle 30 is viewed from the first vehicle 30. As one example, the reconfigured image becomes an image viewed from a driver's seat of the first vehicle 30. For example, in a case where the first vehicle 30 is traveling on a road including a plurality of lanes on one way, the second vehicle 30 and a traffic sign located in front (including obliquely in front) of the first vehicle 30 are displayed in a reconfigured image. Further, in a case where the fallen object 50 is present on a road, the fallen object 50 is also displayed in the reconfigured image. Furthermore, in a case where a pedestrian is present in the vicinity of the first vehicle 30, the pedestrian is also displayed in the reconfigured image.

Further, in the example illustrated in FIG. 6, velocity of the second vehicle 30 is also displayed in the reconfigured image. The velocity is computed by using relative velocity data and vehicle velocity data.

Figure 7:
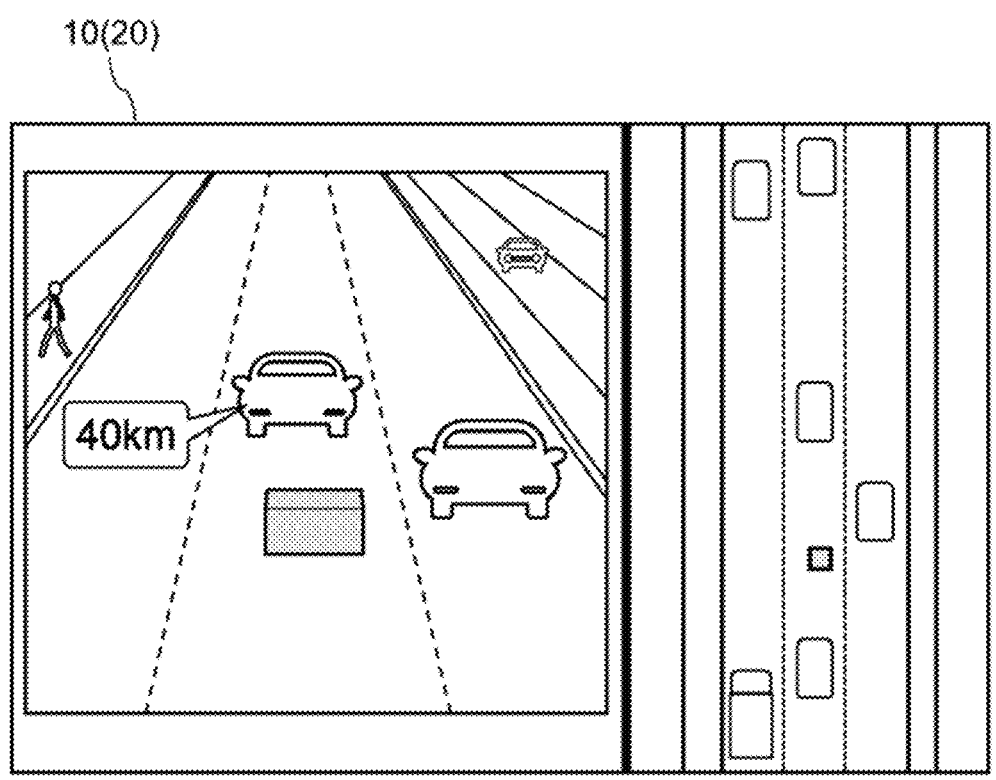
FIG. 7 is a diagram illustrating a second example of a reconfigured image to be displayed on the display in the step S50.

FIG. 7 illustrates a second example of a reconfigured image to be displayed on the display 230 in the step S50. In the example illustrated in FIG. 7, a reconfigured image includes a bird's-eye view, in addition to the image illustrated in FIG. 6. Note that, the reconfigured image may only be a bird's-eye view. Note that, in a case where analysis data are related to a plurality of directions of the first vehicle 30, it is easy to generate a bird's-eye view as a reconfigured image.

Figure 8:
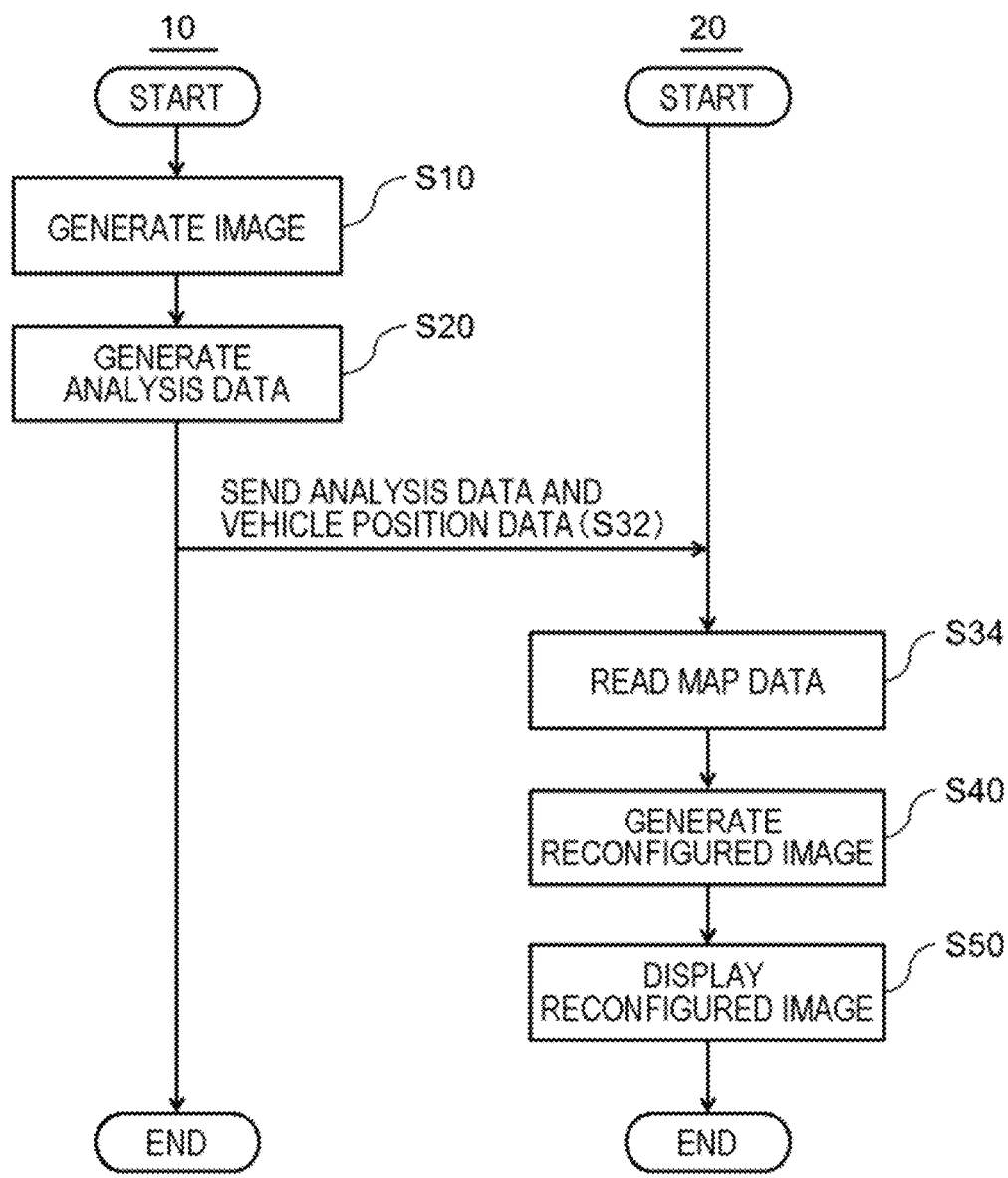
FIG. 8 is a flowchart illustrating a second example of processing to be performed by the image generation apparatus.

FIG. 8 is a flowchart illustrating a second example of processing to be performed by the image generation apparatus 20 together with processing to be performed by the sending apparatus 10. Processing illustrated in FIG. 8 is similar to processing illustrated in FIG. 5 except for a point that map data are used when a reconfigured image is generated. Further, in the example illustrated in FIG. 8, analysis data may not include road data.

After step S20, the communication unit 16 of the sending apparatus 10 sends, to the image generation apparatus 20, vehicle position data together with analysis data. At this occasion, the communication unit 16 sends, together with the analysis data, relative velocity data and vehicle velocity data of the first vehicle 30 (step S32).

When the acquisition unit 210 of the image generation apparatus 20 acquires data sent from the sending apparatus 10, the data processing unit 220 reads, from the map data storage unit 222, map data including a location indicated by vehicle position data (step S34), generates a reconfigured image by using the map data (step S40), and causes the display 230 to display the generated reconfigured image (step S50).

Since using map data makes it unnecessary to generate road data in the image processing unit 14 of the sending apparatus 10, processing load of the image processing unit 14 decreases.

Note that, the data processing unit 220 may generate a first reconfigured image by a method illustrated in FIG. 5, and also generate a second reconfigured image by a method illustrated in FIG. 8. In this case, the data processing unit 220 may cause the display 230 to display the first reconfigured image and the second reconfigured image in a comparable state. For example, the data processing unit 220 may cause the display 230 to display the first reconfigured image and the second reconfigured image side by side, or cause the display 230 to display the first reconfigured image and the second reconfigured image in a superimposed manner. By doing so, a surveillance person can visually recognize a difference (as one example, an anomaly that has occurred on a road) between map data and road data generated by the image processing unit 14 of the sending apparatus 10.

Figure 9:
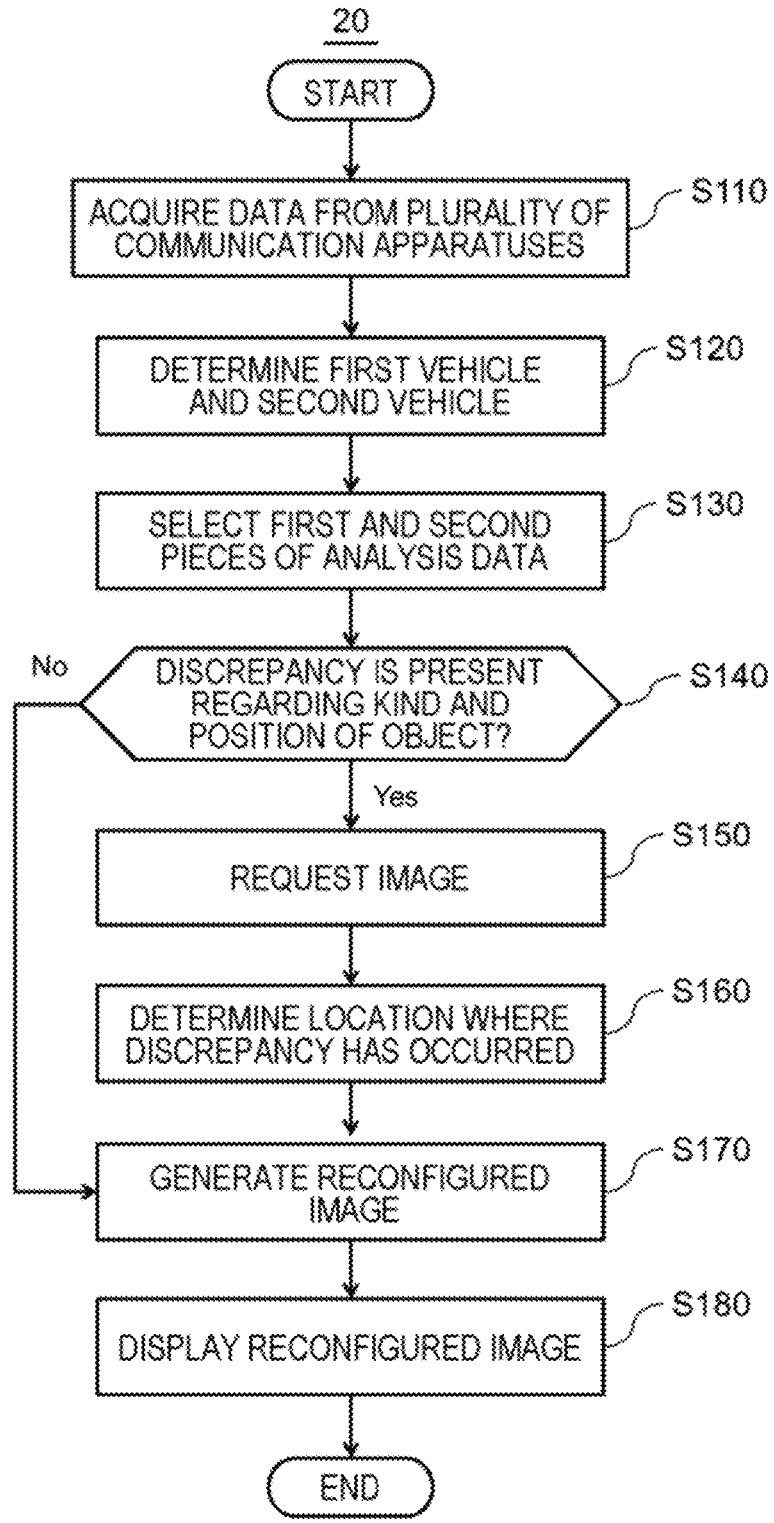
FIG. 9 is a flowchart illustrating a third example of processing to be performed by the image generation apparatus.

FIG. 9 is a flowchart illustrating a third example of processing to be performed by the image generation apparatus 20. In processing illustrated in FIG. 9, the sending apparatus 10 is loaded in each of the vehicles 30. Further, the sending apparatus 10 performs processing illustrated in FIG. 5 or 8.

The acquisition unit 210 of the image generation apparatus 20 acquires, from a plurality of the sending apparatuses 10, analysis data, vehicle position data, vehicle velocity data, and relative velocity data (step S110).

Subsequently, the data processing unit 220 acquires information that determines the vehicle 30 (equivalent to the above-described first vehicle 30) being a target from among the plurality of vehicles 30. The acquisition may be performed, for example, by an input from a surveillance person. Then, the data processing unit 220 determines, as the second vehicle 30, a vehicle 30 located near the first vehicle 30 by using the vehicle position data. As one example, the data processing unit 220 acquires a piece of vehicle position data associated with the first vehicle 30, determines at least one other piece of the vehicle position data whose correlation (e.g., a direction and a distance) with respect to the piece of vehicle position data satisfies a criterion, and sets the vehicle 30 associated with the one other piece of the vehicle position data, as the second vehicle 30. Herein, in a case where a plurality of vehicles 30 are determined, the data processing unit 220 sets these plurality of vehicles 30, as the second vehicle 30 (step S120).

Subsequently, the data processing unit 220 acquires a piece of analysis data (hereinafter, described as a first piece of analysis data) associated with the first vehicle 30, and also selects a piece of analysis data (hereinafter, described as a second piece of analysis data) associated with the second vehicle 30 (step S130). Subsequently, the data processing unit 220 determines whether a discrepancy is present between the first piece of analysis data and the second piece of analysis data. As one example, the data processing unit 220 determines whether a discrepancy is present between a kind and a position of an object indicated by the first piece of analysis data and a kind and a position of an object indicated by the second piece of analysis data (step S140).

For example, the data processing unit 220 determines a position for each object by using position information of the first vehicle 30 and a first piece of analysis data. Likewise, the data processing unit 220 determines a position for each object by using position information of the second vehicle 30 and a second piece of analysis data. Further, the data processing unit 220 determines whether a discrepancy is present between these positions for each object. As one example of a discrepancy, there is a case that an object being present in one analysis result is not present in the other analysis result. Further, as another example of a discrepancy, there is a case that a position of an object indicated by one analysis result, and a position of an object indicated by the other analysis result differ by a value equal to or more than a criterion value.

Further, in a case where a discrepancy is present (step S140: Yes), the data processing unit 220 requests at least either one of the sending apparatus 10 of the first vehicle 10, and the sending apparatus 10 of the second vehicle 30 to send an image (step S150). Thereafter, the sending apparatus 10 sends, to the image generation apparatus 20, an image generated by the image capturing unit 12 together with analysis data, or in place of analysis data. Then, the data processing unit 220 causes the display 230 to display the image. Note that, the data processing unit 220 may display the image and a reconfigured image side by side.

Further, when the data processing unit 220 determines a position (specifically, a location) of an object where a discrepancy has occurred (step S160), the data processing unit 220 generates a reconfigured image in such a way as to include an indication indicating the determined location (step S170), and causes the display 230 to display the generated reconfigured image (step S180). Another indication included in the reconfigured image is as illustrated in FIG. 6 or 7. Herein, in a case where a discrepancy has occurred, the data processing unit 220 may perform a predetermined output such as, for example, an alarm indication.

On the other hand, in a case where no discrepancy is present in the step S140 (step S140: No), the data processing unit 220 generates a reconfigured image (step S170), and causes the display 230 to display the generated reconfigured image (step S180). A reconfigured image to be generated herein is similar to the above-described reconfigured image except for a point that an indication indicating a location where a discrepancy has occurred is not included.

Note that, in any case, in the step S170, the data processing unit 220 generates a reconfigured image by using a first piece of analysis data, and at least one second piece of analysis data. For example, the data processing unit 220 determines a position for each object by using position information of the first vehicle 30 and a first piece of analysis data. Likewise, the data processing unit 220 determines a position for each object by using position information of the second vehicle 30 and a second piece of analysis data. Further, the data processing unit 220 generates a bird's eye view by using these determination results. By doing so, it is possible to determine presence of an object within a range that cannot be covered by the first piece of analysis data by using the second piece of analysis data, and include, in a reconfigured image, an indication indicating the object, together with an indication indicating an object determined by the first piece of analysis data.

Figure 10:
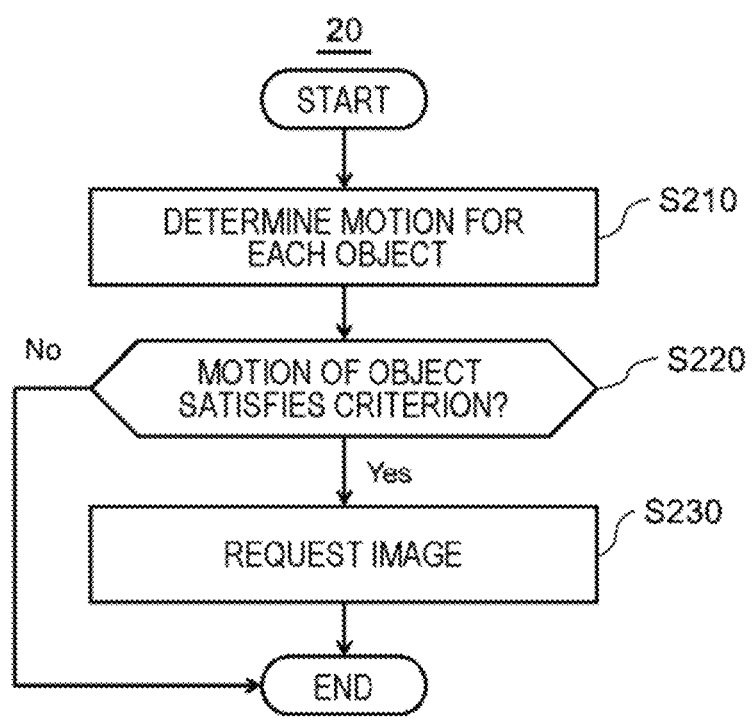
FIG. 10 is a flowchart illustrating a fourth example of processing to be performed by the image generation apparatus.

FIG. 10 is a flowchart illustrating a fourth example of processing to be performed by the image generation apparatus 20. Processing illustrated in FIG. 10 is performed in parallel to processing illustrated in FIG. 5, 8, or 9, each time the image generation apparatus 20 acquires analysis data.

First, the data processing unit 220 determines a motion of an object for each detected object by using analysis data sent from the sending apparatus 10 of the first vehicle 30. For example, the data processing unit 220 determines a motion of an object by using a difference between a piece of analysis data acquired at this time, and a piece of analysis data acquired a while ago (step S210). Further, the data processing unit 220 determines whether the motion of the object determined in the step S210 satisfies a criterion defined for each object (step S220).

For example, in a case where an object is a pedestrian, the criterion is that the pedestrian is moving toward a roadway. Further, in a case where an object is the second vehicle 30, the criterion is a case that a relative position of the second vehicle 30 with respect to the first vehicle 30, or a change of the relative position is determined to be anomalous. Specific examples of the case include a case that the second vehicle 30 is an oncoming vehicle, and a case that an oncoming vehicle is moving at an improbable velocity. Note that, determination as to an anomaly is performed by using, for example, a model generated by machine learning. Further, in a case where analysis data include an error, a change of the above-described relative position may indicate a physically improbable behavior. The data processing unit 220 also determines that the above case is anomalous.

In the step S220, in a case where the criterion is satisfied (step S220: Yes), the data processing unit 220 requests the sending apparatus 10 of the first vehicle 30 to send an image (step S230). Thereafter, the sending apparatus 10 sends, to the image generation apparatus 20, an image generated by the image capturing unit 12 together with analysis data, or in place of analysis data. Then, the data processing unit 220 causes the display 230 to display the image. Note that, the data processing unit 220 may display the image and a reconfigured image side by side.

Note that, the communication unit 16 of the sending apparatus 10 may determine whether analysis data satisfies a criterion, in place of the image generation apparatus 20. One example of the determination is processing indicated in the steps S210 and S220 in FIG. 10. Further, another example of the determination is a case that reliability (e.g., a score when an object is detected) of analysis data does not satisfy a criterion. Further, in a case where analysis data satisfy a criterion, the communication unit 16 sends, to the image generation apparatus 20, an image generated by the image capturing unit 12 together with analysis data or in place of analysis data.

Figure 11:
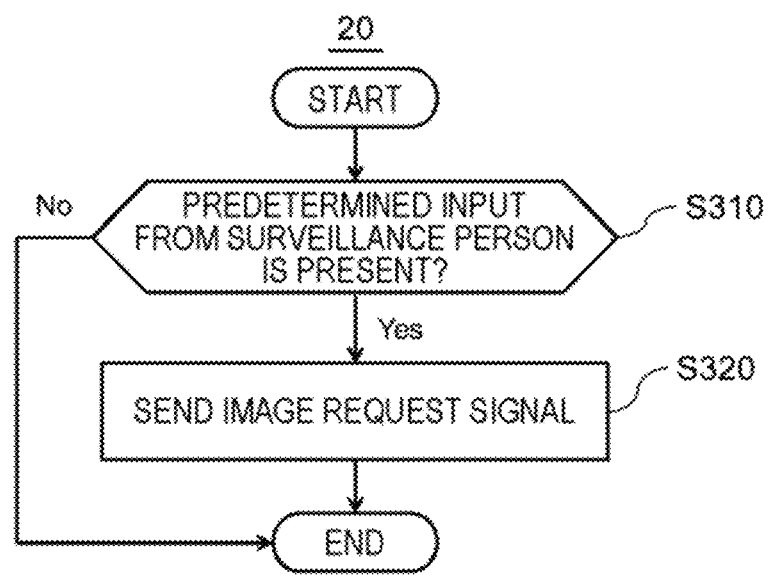
FIG. 11 is a flowchart illustrating a fifth example of processing to be performed by the image generation apparatus.

FIG. 11 is a flowchart illustrating a fifth example of processing to be performed by the image generation apparatus 20. Processing illustrated in FIG. 11 is performed in parallel to processing illustrated in FIG. 5, 8, or 9, and processing illustrated in FIG. 10.

In the example illustrated in FIG. 11, a surveillance person using the image generation apparatus 20 checks a reconfigured image. Further, when a surveillance person determines that it is better to directly check an image generated by the image capturing unit 12 of the sending apparatus 10, the surveillance person performs a predetermined input to the image generation apparatus 20 (step S310: Yes). Examples of a case as described above include, for example, a case that an anomaly has occurred regarding a motion of any one of the vehicles 30, and a case that vehicles 30 in various directions are included in a reconfigured image in a bird's eye view. Examples of the former example include a case that a fallen object 50 that cannot be captured by image processing is present, and a case that a road construction is being performed. Then, the data processing unit 220 requests the sending apparatus 10 of the first vehicle 30 to send an image (step S320). Processing to be performed thereafter is as described with reference to FIG. 10.

As described above, according to the present example embodiment, the sending apparatus 10 sends, to the image generation apparatus 20, analysis data being an analysis result of an image, in place of the image. The analysis data include at least type data indicating a kind of an object located in the vicinity of a vehicle 30, and relative position data indicating a relative position of the object with respect to the vehicle 30. Further, the data processing unit 220 of the image generation apparatus 20 generates a reconfigured image by using the analysis data, and causes the display 230 to display the reconfigured image. Therefore, a surveillance person can check the object being present in the vicinity of the vehicle 30. Further, as compared with a case where the sending apparatus 10 sends an image to the image generation apparatus 20, an amount of communication between the sending apparatus 10 and the image generation apparatus 20 decreases.

Further, the image generation apparatus 20 requests the sending apparatus 10 for an image, when a criterion is satisfied. Then, the sending apparatus 10 sends the image to the image generation apparatus 20. The data processing unit 220 of the image generation apparatus 20 causes the display 230 to display the image acquired from the sending apparatus 10. In this way, the image generation apparatus 20 causes the display 230 to display an image generated by the image capturing unit 12, when needed. Therefore, it is possible to improve quality of surveillance by a surveillance person.

As described above, an example embodiment according to the present invention has been described with reference to the drawings, however, these are an example of the present invention, and various configurations other than the above can also be adopted.

Further, in a plurality of flowcharts used in the above description, a plurality of steps (pieces of processing) are described in order, however, an order of execution of steps to be performed in each example embodiment is not limited to the order of description. In each example embodiment, the order of illustrated steps can be changed within a range that does not adversely affect a content. Further, the above-described example embodiments can be combined, as far as contents do not conflict with each other.

A part or all of the above-described example embodiments may also be described as the following supplementary notes, but is not limited to the following.

1. An image generation apparatus, including:
    an acquisition unit that repeatedly acquires analysis data, the analysis data being a result of processing a captured image generated by an image capturing unit loaded in a vehicle, and the analysis data including type data and relative position data, the type data indicating a kind of an object located in a vicinity of the vehicle and the relative position data indicating a relative position of the object with respect to the vehicle; and
    a data processing unit that generates a reconfigured image each time the acquisition unit acquires the analysis data, the reconfigured image including an indication based on the type data in a position associated with the relative position data, and displaying the generated reconfigured image on a display.

2. The image generation apparatus according to supplementary note 1 described above, wherein
    the analysis data further include road data indicating a state of a road located in the vicinity of the vehicle, and
    the data processing unit includes an indication of the road according to the road data in the reconfigured image.

3. The image generation apparatus according to supplementary note 1 or 2 described above, wherein
    the acquisition unit acquires, together with the analysis data, vehicle position data indicating a position of the vehicle, and
    the data processing unit acquires map data including a location associated with the vehicle position data, and includes a road based on the map data in the reconfigured image.

4. The image generation apparatus according to any one of supplementary notes 1 to 3 described above, wherein
    the acquisition unit acquires, together with the analysis data, vehicle position data indicating a position of the vehicle from each of a plurality of the vehicles,
    when the data processing unit acquires information that determines vehicle position data,
    the data processing unit
    acquires first analysis data associated with one piece of the vehicle position data,
    acquires at least one other piece of the vehicle position data in which relevance to the one piece of the vehicle position data satisfies a reference, and acquires second analysis data associated with the at least one other piece of the vehicle position data, and
    generates the reconfigured image by using the first analysis data and at least one of the second analysis data.

5. The image generation apparatus according to supplementary note 4 described above, wherein
    the data processing unit performs a predetermined output when a discrepancy occurs between a kind and a position of the object indicated by the first analysis data and a kind and a position of the object indicated by the second analysis data.

6. The image generation apparatus according to supplementary note 5 described above, wherein
    the data processing unit includes, in the reconfigured image, information indicating a position of the object in which the discrepancy occurs.

7. The image generation apparatus according to any one of supplementary notes 1 to 6 described above, wherein
    the object is another vehicle located in the vicinity of the vehicle,
    the analysis data further include relative velocity data indicating a relative velocity of the vehicle and the another vehicle,
    the acquisition unit further acquires, together with the analysis data, vehicle velocity data indicating a velocity of the vehicle, and
    the data processing unit further estimates a velocity of the another vehicle by using the vehicle velocity data and the relative velocity data, and displays an indication indicating a result of the estimation together with the reconfigured image or in the reconfigured image.

8. The image generation apparatus according to any one of supplementary notes 1 to 7 described above, wherein
    the data processing unit generates, as the reconfigured image, an image in which the outside of the vehicle is viewed from the vehicle.

9. The image generation apparatus according to any one of supplementary notes 1 to 7 described above, wherein
    the data processing unit generates a bird's-eye view as the reconfigured image.

10. The image generation apparatus according to any one of supplementary notes 1 to 9 described above, wherein
a frequency at which the acquisition unit acquires the analysis data changes according to a velocity of the vehicle.

11. The image generation apparatus according to any one of supplementary notes 1 to 10 described above, wherein
the analysis data indicate a difference from the type data and the relative position data that are indicated by the analysis data being sent in the past.

12. The image generation apparatus according to any one of supplementary notes 1 to 11 described above, wherein
the vehicle is an automatic driving vehicle, and
the display is disposed at a surveillance center that surveys the vehicle.

13. An image generation method, including:
by a computer,
acquisition processing of repeatedly acquiring analysis data, the analysis data being a result of processing a captured image generated by an image capturing unit loaded in a vehicle, and the analysis data including type data and relative position data, the type data indicating a kind of an object located in a vicinity of the vehicle and the relative position data indicating a relative position of the object with respect to the vehicle; and
data processing of generating a reconfigured image each time the analysis data are acquired, the reconfigured image including an indication based on the type data in a position associated with the relative position data, and displaying the generated reconfigured image on a display.

14. The image generation method according to supplementary note 13 described above, wherein
the analysis data further include road data indicating a state of a road located in the vicinity of the vehicle,
the image generation method further including,
by the computer,
including an indication of the road according to the road data in the reconfigured image.

15. The image generation method according to supplementary note 13 or 14 described above, further including:
by the computer,
acquiring, together with the analysis data, vehicle position data indicating a position of the vehicle; and
acquiring map data including a location associated with the vehicle position data, and including a road based on the map data in the reconfigured image.

16. The image generation method according to any one of supplementary notes 13 to 15 described above, further including:
by the computer,
acquiring, together with the analysis data, vehicle position data indicating a position of the vehicle from each of a plurality of the vehicles;
when information that determines vehicle position data is acquired,
acquiring first analysis data associated with one piece of the vehicle position data;
acquiring at least one other piece of the vehicle position data in which relevance to the one piece of the vehicle position data satisfies a reference, and acquiring second analysis data associated with the at least one other piece of the vehicle position data; and
generating the reconfigured image by using the first analysis data and at least one of the second analysis data.

17. The image generation method according to supplementary note 16 described above, further including,
by the computer,
performing a predetermined output when a discrepancy occurs between a kind and a position of the object indicated by the first analysis data and a kind and a position of the object indicated by the second analysis data.

18. The image generation method according to supplementary note 17 described above, further including,
by the computer,
including, in the reconfigured image, information indicating a position of the object in which the discrepancy occurs.

19. The image generation method according to any one of supplementary notes 13 to 18 described above, wherein
the object is another vehicle located in the vicinity of the vehicle,
the analysis data further include relative velocity data indicating a relative velocity of the vehicle and the another vehicle,
the image generation method further including:
by the computer,
acquiring, together with the analysis data, vehicle velocity data indicating a velocity of the vehicle; and
estimating a velocity of the another vehicle by using the vehicle velocity data and the relative velocity data, and displaying an indication indicating a result of the estimation together with the reconfigured image or in the reconfigured image.

20. The image generation method according to any one of supplementary notes 13 to 19 described above, further including,
by the computer,
generating, as the reconfigured image, an image in which the outside of the vehicle is viewed from the vehicle.

21. The image generation method according to any one of supplementary notes 13 to 19 described above, further including,
by the computer,
generating a bird's-eye view as the reconfigured image.

22. The image generation method according to any one of supplementary notes 13 to 21 described above, wherein
a frequency at which the computer acquires the analysis data changes according to a velocity of the vehicle.

23. The image generation method according to any one of supplementary notes 13 to 22 described above, wherein
the analysis data indicate a difference from the type data and the relative position data that are indicated by the analysis data being sent in the past.

24. The image generation method according to any one of supplementary notes 13 to 23 described above, wherein
the vehicle is an automatic driving vehicle, and
the display is disposed at a surveillance center that surveys the vehicle.

25. A program causing a computer to include:
an acquisition function of repeatedly acquiring analysis data, the analysis data being a result of processing a captured image generated by an image capturing unit loaded in a vehicle, and the analysis data including type data and relative position data, the type data indicating a kind of an object located in a vicinity of the vehicle and the relative position data indicating a relative position of the object with respect to the vehicle; and
a data processing function of generating a reconfigured image each time the acquisition function acquires the analysis data, the reconfigured image including an indication based on the type data in a position associated with the relative position data, and displaying the generated reconfigured image on a display.

26. The program according to supplementary note 25 described above, wherein the analysis data further include road data indicating a state of a road located in the vicinity of the vehicle, and the data processing function includes an indication of the road according to the road data in the reconfigured image.

27. The program according to supplementary note 25 or 26 described above, wherein the acquisition function acquires, together with the analysis data, vehicle position data indicating a position of the vehicle, and the data processing function acquires map data including a location associated with the vehicle position data, and includes a road based on the map data in the reconfigured image.

28. The program according to any one of supplementary notes 25 to 27 described above, wherein the acquisition function acquires, together with the analysis data, vehicle position data indicating a position of the vehicle from each of a plurality of the vehicles, when the data processing function acquires information that determines vehicle position data, the data processing function acquires first analysis data associated with one piece of the vehicle position data, acquires at least one other piece of the vehicle position data in which relevance to the one piece of the vehicle position data satisfies a reference, and acquires second analysis data associated with the at least one other piece of the vehicle position data, and generates the reconfigured image by using the first analysis data and at least one of the second analysis data.

29. The program according to supplementary note 28 described above, wherein the data processing function performs a predetermined output when a discrepancy occurs between a kind and a position of the object indicated by the first analysis data and a kind and a position of the object indicated by the second analysis data.

30. The program according to supplementary note 29 described above, wherein the data processing function includes, in the reconfigured image, information indicating a position of the object in which the discrepancy occurs.

31. The program according to any one of supplementary notes 25 to 30 described above, wherein the object is another vehicle located in the vicinity of the vehicle, the analysis data further include relative velocity data indicating a relative velocity of the vehicle and the another vehicle, the acquisition function further acquires, together with the analysis data, vehicle velocity data indicating a velocity of the vehicle, and the data processing function further estimates a velocity of the another vehicle by using the vehicle velocity data and the relative velocity data, and displays an indication indicating a result of the estimation together with the reconfigured image or in the reconfigured image.

32. The program according to any one of supplementary notes 25 to 31 described above, wherein the data processing function generates, as the reconfigured image, an image in which the outside of the vehicle is viewed from the vehicle.

33. The program according to any one of supplementary notes 25 to 31 described above, wherein the data processing function generates a bird's-eye view as the reconfigured image.

34. The program according to any one of supplementary notes 25 to 34 described above, wherein a frequency at which the acquisition function acquires the analysis data changes according to a velocity of the vehicle.

35. The program according to any one of supplementary notes 25 to 34 described above, wherein the analysis data indicate a difference from the type data and the relative position data that are indicated by the analysis data being sent in the past.

This application is based upon and claims the benefit of priority from Japanese patent application No. 2020-049868, filed on Mar. 19, 2020, the disclosure of which is incorporated herein in its entirety by reference.

REFERENCE SIGNS LIST

10 Sending apparatus
12 Image capturing unit
14 Image processing unit
16 Communication unit
20 Image generation apparatus
210 Acquisition unit
220 Data processing unit
222 Map data storage unit
230 Display

What is claimed is:

1. An apparatus placed away from a vehicle, the apparatus comprising:
   at least one memory configured to store instructions; and
   at least one processor configured to execute the instructions to perform operations comprising:
   acquiring, from a sending apparatus loaded in the vehicle, analysis data generated by processing a captured image from an image sensor loaded in the vehicle, the analysis data including type data and relative position data, the type data indicating a kind of an object located in a vicinity of the vehicle and the relative position data indicating a relative position of the object with respect to the vehicle;
   generating a first reconfigured image by arranging an indication of the object based on the type data and the relative position data;
   determining whether a change of the relative position of the object is anomalous;
   acquiring the captured image from the sending apparatus; and
   displaying the first reconfigured image and the captured image in parallel on a display, wherein the first reconfigured image includes the indication of the object whose change of the relative position is determined to be anomalous.

2. The apparatus according to claim 1, wherein
   the analysis data further include road data indicating a state of a road located in the vicinity of the vehicle, and
   the operations further comprise including an indication of the road according to the road data in the first reconfigured image.

3. The apparatus according to claim 1, wherein the operations comprise:
   acquiring vehicle position data indicating a position of the vehicle;
   generating a second reconfigured image by arranging, based on the type data and the relative position data, an indication of the object on a road image generated from the map data; and
   displaying the first reconfigured image and the second reconfigured image in parallel on the display.

4. The apparatus according to claim 1, wherein the operations comprise:
   in response to determining that the change of the relative position of the object is not anomalous, generating the first reconfigured image of the captured image and displaying the first reconfigured image on the display; and
   in response to determining that the change of the relative position of the object is anomalous, acquiring the captured image from the sending apparatus loaded in the vehicle and displaying the first reconfigured image and the captured image in parallel on the display.

5. The apparatus according to claim 1, wherein
   the indication of the object is a block shape in a case where the kind of the object is a vehicle.

6. The apparatus according to 1, wherein
   the operations comprise generating a bird's-eye view as the first reconfigured image.

7. The apparatus according to claim 1, wherein the operations comprise
   determining that the change of the relative position of the object is anomalous in a case where the change of the relative position of the object indicates a physically improbable behavior.

8. The image generation method according to claim 1, further comprising:
   in response to determining that the change of the relative position of the object is not anomalous, generating the first reconfigured image of the captured image and displaying the first reconfigured image on the display; and
   in response to determining that the change of the relative position of the object is anomalous, acquiring the captured image from the sending apparatus loaded in the vehicle and displaying the first reconfigured image and the captured image in parallel on the display.

9. An image generation method, comprising:
   by a computer placed away from a vehicle,
   acquiring, from a sending apparatus loaded in the vehicle, analysis data generated by processing a captured image from an image sensor loaded in the vehicle, the analysis data including type data and relative position data, the type data indicating a kind of an object located in a vicinity of the vehicle and the relative position data indicating a relative position of the object with respect to the vehicle;
   generating a first reconfigured image by arranging an indication of the object based on the type data and the relative position data;
   determining whether a change of the relative position of the object is anomalous;
   acquiring the captured image from the sending apparatus; and
   displaying the first reconfigured image and the captured image in parallel on a display, wherein the first reconfigured image includes the indication of the object whose change of the relative position is determined to be anomalous.

10. The image generation method to claim 9, wherein
    the analysis data further include road data indicating a state of a road located in the vicinity of the vehicle, and
    the image generation method further comprises including an indication of the road according to the road data in the first reconfigured image.

11. The image generation method according to claim 9, further comprising:
    acquiring vehicle position data indicating a position of the vehicle;
    acquiring map data including a location associated with the vehicle position data;
    generating a second reconfigured image by arranging, based on the type data and the relative position data, an indication of the object on a road image generated from the map data; and
    displaying the first reconfigured image and the second reconfigured image in parallel on the display.

12. The image generation method according to claim 9, wherein
    the indication of the object is a block shape in a case where the kind of the object is a vehicle.

13. The image generation method according to claim 9, further comprising
    generating a bird's-eye view as the first reconfigured image.

14. The image generation method according to claim 9, further comprising
    determining that the change of the relative position of the object is anomalous in a case where the change of the relative position of the object indicates a physically improbable behavior.

15. A non-transitory computer-readable medium storing a program causing a computer placed away from a vehicle to perform operations comprising:
    acquiring, from a sending apparatus loaded in the vehicle, analysis data generated by processing a captured image from an image sensor loaded in the vehicle, the analysis data including type data and relative position data, the type data indicating a kind of an object located in a vicinity of the vehicle and the relative position data indicating a relative position of the object with respect to the vehicle;
    generating a first reconfigured image by arranging an indication of the object based on the type data and the relative position data;
    determining whether a change of the relative position of the object is anomalous;
    acquiring the captured image from the sending apparatus; and
    displaying the first reconfigured image and the captured image in parallel on a display, wherein the first reconfigured image includes the indication of the object whose change of the relative position is determined to be anomalous.

16. The non-transitory computer-readable medium according to claim 15, wherein
    the analysis data further include road data indicating a state of a road located in the vicinity of the vehicle, and
    the operations further comprise including an indication of the road according to the road data in the first reconfigured image.

17. The non-transitory computer-readable medium according to claim 15, wherein the operations comprise:
    acquiring vehicle position data indicating a position of the vehicle;
    acquiring map data including a location associated with the vehicle position data;
    generating a second reconfigured image by arranging, based on the type data and the relative position data, an indication of the object on a road image generated from the map data; and
    displaying the first reconfigured image and the second reconfigured image in parallel on the display.

18. The non-transitory computer-readable medium according to claim 15, wherein the operations comprise:
   in response to determining that the change of the relative position of the object is not anomalous, generating the first reconfigured image of the captured image and displaying the first reconfigured image on the display; and
   in response to determining that the change of the relative position of the object is anomalous, acquiring the captured image from the sending apparatus loaded in the vehicle and displaying the first reconfigured image and the captured image in parallel on the display.

19. The non-transitory computer-readable medium according to claim 15, wherein
   the indication of the object is a block shape in a case where the kind of the object is a vehicle.

20. The non-transitory computer-readable medium according to claim 15, wherein the operations comprise generating a bird's-eye view as the first reconfigured image.

* * * * *